US006754389B1

(12) United States Patent
Dimitrova et al.

(10) Patent No.: US 6,754,389 B1
(45) Date of Patent: Jun. 22, 2004

(54) PROGRAM CLASSIFICATION USING OBJECT TRACKING

(75) Inventors: Nevenka Dimitrova, Yorktown Heights, NY (US); Lalitha Agnihotri, Fishkill, NY (US); Gang Wei, Detroit, MI (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/452,581

(22) Filed: Dec. 1, 1999

(51) Int. Cl.[7] .................................................. G06K 9/62
(52) U.S. Cl. ....................... 382/224; 348/169; 348/699; 382/103; 382/118; 382/156; 382/159; 382/176; 382/203
(58) Field of Search ................................ 382/103, 115, 382/118, 156, 159, 203, 224; 348/722, 169, 699; 345/419, 427, 656

(56) References Cited

U.S. PATENT DOCUMENTS

| | | | | |
|---|---|---|---|---|
| 5,710,875 A | * | 1/1998 | Harashima et al. | ......... 345/419 |
| 5,812,193 A | * | 9/1998 | Tomitaka et al. | ........... 348/369 |
| 5,912,980 A | * | 6/1999 | Hunke | ......................... 382/103 |
| 5,983,251 A | * | 11/1999 | Martens et al. | ............. 708/203 |
| 6,028,956 A | * | 2/2000 | Shustorovich et al. | ...... 382/156 |
| 6,072,542 A | * | 6/2000 | Wilcox et al. | ............... 348/722 |
| 6,118,887 A | * | 9/2000 | Cosatto et al. | .............. 382/103 |
| 6,275,614 B1 | * | 8/2001 | Krishnamurthy et al. | ... 382/224 |
| 6,404,925 B1 | * | 6/2002 | Foote et al. | ................. 382/224 |
| 6,445,810 B2 | * | 9/2002 | Darrell et al. | .............. 382/115 |
| 6,456,328 B1 | * | 9/2002 | Okada | ........................ 348/390 |

FOREIGN PATENT DOCUMENTS

| | | | |
|---|---|---|---|
| EP | 0005918 A1 | 12/1979 | ............. G01S/3/78 |
| EP | 0805405 A2 | 5/1997 | ........... G06F/17/30 |
| EP | 0805405 A2 | 11/1997 | ........... G06F/17/30 |
| WO | WO9427404 | 11/1994 | ............. H04N/5/91 |
| WO | WO9740454 | 10/1997 | ........... G06F/17/30 |
| WO | WO9748068 | 12/1997 | ............. G06K/9/00 |

OTHER PUBLICATIONS

Zhong et al: "Video model and segmentation for content-based video indexing," Circuits And Systems, 1997, ISCAS '97., Proceedings of 1997 IEEE International Syumposium On Hong Kong Jun. 9–12, 1997, Jun. 9, 1997, pp. 1492–1495.

Pavlovic et al: "Time–Series Classification Using Mixed-–State Dynamic Bayesian Networks," Proceedings 1999 IEEE Computer Society Conference On Computer Vision And Pattern Recognition. Jun. 23–25, 1999, Jun. 23, 1999, pp. 609–615.

* cited by examiner

*Primary Examiner*—Jayanti K. Patel
*Assistant Examiner*—Gregory Desire

(57) ABSTRACT

A content-based classification system is provided that detects the presence of object images within a frame and determines the path, or trajectory, of each object image through multiple frames of a video segment. In a preferred embodiment, face objects and text objects are used for identifying distinguishing object trajectories. A combination of face, text, and other trajectory information is used in a preferred embodiment of this invention to classify each segment of a video sequence. In one embodiment, a hierarchical information structure is utilized to enhance the classification process. At the upper, video, information layer, the parameters used for the classification process include, for example, the number of object trajectories of each type within the segment, an average duration for each object type trajectory, and so on. At the lowest, model, information layer, the parameters include, for example, the type, color, and size of the object image corresponding to each object trajectory. In an alternative embodiment, a Hidden Markov Model (HMM) technique is used to classify each segment into one of a predefined set of classifications, based on the observed characterization of the object trajectories contained within the segment.

18 Claims, 4 Drawing Sheets

PROGRAM CLASSIFICATION USING OBJECT TRACKING

BACKGROUND OF THE INVENTION

1. Field of the Invention

This invention relates to the field of communications and information processing, and in particular to the field of video categorization and retrieval.

2. Description of Related Art

Consumers are being provided an ever increasing supply of information and entertainment options. Hundreds of television channels are available to consumers, via broadcast, cable, and satellite communications systems. Because of the increasing supply of viewing options, it is becoming increasingly more difficult for a consumer to locate programs of specific interest. A number of techniques have been proposed for easing the selection task, most of which are based on a classification of the available programs, based on the content of each program.

A classification of program material may be provided via a manually created television guide, or by other means, such as an auxiliary signal that is transmitted with the content material. Such classification systems, however, are typically limited to broadcast systems, and require the availability of the auxiliary information, such as the television guide or other signaling. Additionally, such classification systems do not include detailed information, such as the time or duration of commercial messages, news bulletins, and so on. A viewer, for example, may wish to "channel surf" during a commercial break in a program, and automatically return to the program when the program resumes. Such a capability can be provided with a multi-channel receiver, such as a picture-in-picture receiver, but requires an identification of the start and end of each commercial break. In like manner, a viewer may desire the television to remain blank and silent except when a news or weather bulletin occurs. Conventional classification systems do not provide Sufficient detail to support selective viewing of segments of programs.

Broadcast systems require a coincidence of the program broadcast time and the viewer's available viewing time. Video recorders, including multiple-channel video recorders, are often used to facilitate the viewing of programs at times other than their broadcast times. Video recorders also allow viewers to select. specific portions of recorded programs for viewing. For example, commercial segments may be skipped while viewing an entertainment or news program, or, all non-news material may be skipped to provide a consolidation of the day's news at select times. Conventional classification systems are often incompatible with a retrieval of the program from a recorded source. The conventional television guide, for example, provides information for locating a specific program at a specific time of day, but cannot directly provide information for locating a specific program on a recorded disk or tape. As noted above, the conventional guides and classification systems are also unable to locate select segments of programs for viewing.

BRIEF SUMMARY OF THE INVENTION

It is an object of this invention to provide a method and system that facilitate an automated classification of content material within segments, or clips, of a video broadcast or recording. The classification of each segment within a broadcast facilitates selective viewing, or non-viewing, of particular types of content material, and can also be used to facilitate the classification of a program based on the classification of multiple segments within the program.

The object of this invention, and others, are achieved by providing a content-based classification system that detects the presence of objects within a frame and determines the path, or trajectory, of each object through multiple frames of a video segment. In a preferred embodiment, the system detects the presence of facial images and text images within a frame and determines the path, or trajectory, of each image through multiple frames of the video segment. The combination of face trajectory and text trajectory information is used in a preferred embodiment of this invention to classify each segment of a video sequence. To enhance the classification process, a hierarchical information structure is utilized. At the upper, video, information layer, the parameters used for the classification process include, for example, the number of object trajectories of each object type within the segment, an average duration for object type trajectory, and so on. At the lowest, model, information layer, the parameters include, for example, the type, color, and size of the object corresponding to each object trajectory. In an alternative embodiment, a Hidden Markov Model (HMM) technique is used to classify each segment into one of a predefined set of classifications, based on the observed characterization of the object trajectories contained with the segment.

BRIEF DESCRIPTION OF THE DRAWINGS

The invention is explained in further detail, and by way of example, with reference to the accompanying drawings wherein.

Throughout the drawings, the same reference numerals indicate similar or corresponding features or functions.

DETAILED DESCRIPTION OF THE INVENTION

Figure 1:
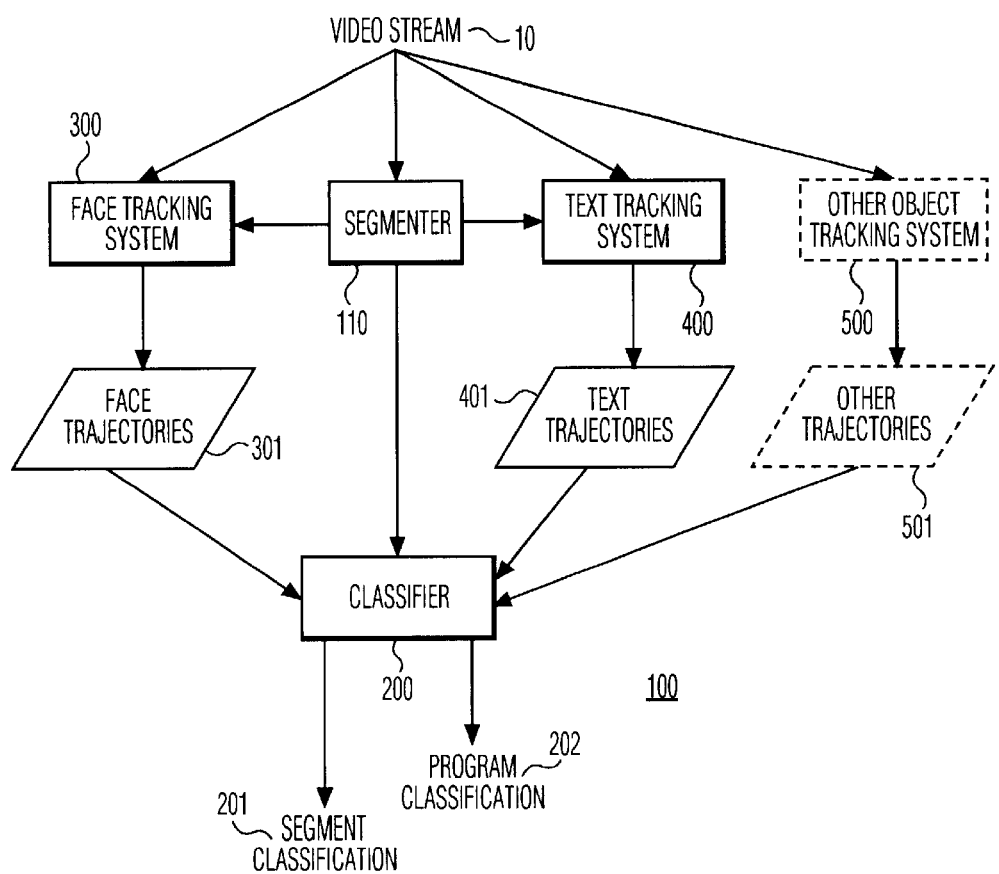
FIG. 1 illustrates an example block diagram of an image processor for classifying a sequence of image frames based on object trajectories.

FIG. 1 illustrates an example block diagram of an image processor 100 for classifying a sequence of image frames based on object trajectories. The object that is tracked through the sequence of image frames can be any type of object that facilitates an identification of the class to which the sequence of image frames belongs. For example, figure tracking can be used to identify and track the moving figures within each sequence of images, to distinguish, for example, between a segment of a football game and a segment of a cooking show. It has been found that the trajectories of face objects and text objects are particularly well suited for distinguishing among common television program classes. It has also been found, as discussed below, that face objects and text objects have significantly different characteristics with regard to the partitioning of sequences of image frames into classifiable segments. Because face and text trajectories are particularly well suited for program classification and each requires somewhat different processing, face and text trajectories are herein used as paradigms for different object trajectories. As will be evident to one of ordinary skill in the art, the principles presented herein are applicable to other object types, such as human figure objects, animal figure objects, vehicle figure objects, hand (gesture) objects, and so on.

The example image processor 100 includes a video segmenter 110, a face tracking system 300, a text tracking system 400, an "other object" tracker 500 and a classifier 200. For ease of reference and understanding, because face tracking and text tracking serve as the paradigm for tracking other objects, the "other object" tracker 500 and corresponding "other" trajectories 501 are not discussed further herein, their function and embodiment being evident to one of ordinary skill in the art in light of the detail presentation below of the function and embodiment of the face 300 and text 400 tracking systems, and corresponding face 301 and text 401 trajectories.

The video segmenter 110 in the example processor 100 identifies distinct sequences of a video stream 10 to facilitate the processing and classification process. The video segmenter 110 employs one or more commonly available techniques, such as cut detection, to identify "physical" segments, or shots, within the stream 10. This physical segmentation is preliminary. In a soap opera program, for example, a dialog between two people is often presented as a series of alternating one-person shots, whereas the sequence of these shots, and others, between two commercial breaks forms a "logical" segment of the video stream 10. Physical segmentation facilitates the processing of a video stream because logical segments, in general, begin and end on physical segment boundaries. Note that at various stages of the processing of the frames of the video stream 10, the bounds of the segments may vary, and segments may merge to form a single segment, or split to form individual segments. For example, until the series of alternating one person shots are identified as a dialog segment, they are referred to as individual segments; in like manner, individual shots with a common text caption form a common segment only after the caption is recognized as being common to each segment. Note also that a segment, or sequence of image frames, need not be a contiguous sequence of image frames. For example, for ease of processing or other efficiency, a sequence of image frames forming a segment or program segment may exclude those frames classified as commercial, so hat the non-commercial frames can be processed and classified as a single logical segment.

The face tracking system 300 identifies faces in each segment of the video stream 10, and tracks: each face from frame to frame in each of the image frames of the segment. The face tracking system 300 provides a face trajectory 301,for each detected face. The face trajectory 301 includes such trajectory information as the coordinates of the face within each frame, the coordinates of the. face in an initial frame and a movement vector that describes the path of the face through the segment, and/or more abstract information such as a characterization of the path of the face, such as "medium distance shot, linear movement", or "close-up shot, off-center, no movement", and so on. Other trajectory information, such as the duration of time, or number of frames, that the face appears within the segment are also included in the parameters of each face trajectory 301, as well as characteristics associated with each face, such as color, size, and so on.

The classifier 200 uses the face trajectories 301 of the various segments of the video stream 10 to determine the classification 201 of each segment, or sets of segments 202, of the video stream 10. For example, an anchor person in a news segment is often presented in a medium distance shot with insubstantial movement, as contrast to a situation comedy that may also typically include a medium distance shot, but usually with significantly more movement than an anchor person shot. In like manner, a weather newscaster is often shown in a longer distance shot, with gradual movement side to side; a commercial segment may also include a long distance shot with gradual side to side movement, but the length, or duration, of the commercial segment containing the long distance shot is typically significantly shorter than a weather report. In a similar manner, collections of segments can be grouped to form a single segment for classification. For example, a trio of segments comprising a medium distance shot with insubstantial movement, followed by a very long distance shot with somewhat random face trajectories, followed by a medium distance shot with multiple face trajectories, can be determined to be an anchor person introducing a news story, followed by footage of the news event, followed by a reporter conducting on-the-scene interviews. Having made this determination, the classifier 200 groups these three segments as a single segment with a "news" classification 201. Subsequently, having determined a multitude of such news segments separated by commercial segments, the classifier 200 classifies the set of these news segments as a program with a "news" classification 202.

The particular choice of classes, and the relationship among classes, for the classification process is optional. For example, a "weather" classification can be defined in some systems, so as to distinguish weather news from other news; similarly, "sports-news", "market-news", "political-news", etc. classifications can be defined. These classifications may be independent classifications, or they may be subsets of a news classification in a hierarchical classification system. In like manner, a matrix classification system may be utilized, wherein a "sports-news" classification is related to a "news" family as well as a "sports" family of classifications. In like-manner, some classifications may be temporary, or internal to the classifier 200. For example, the introduction to programs can often be distinguished from other segments, and an initial "introduction" classification applied. When subsequent segments are classified, the classification of the subsequent segments is applied to the segment having the interim "introduction" classification. Note also that a classified segment may include sub-segments of the same, or different classifications. A half-hour block of contiguous frames may be classified as a "news" program, or segment, and may contain news, sports-news, commercial, and other segments; similarly, a sports-news segment may include a sequence of non-contiguous, non-commercial frames comprising baseball-news, football-news, and so on.

In a preferred embodiment the classification organization is chosen to further facilitate the determination of classifications of segments and,sets of segments. For example, a common half hour news format is national news, followed by sports, followed by weather news, then followed by local news, with interspersed commercial segments. If the classifier 200 detects this general format within a half hour period of video segments, segments within this period that had been too ambiguous to classify are reassessed with a strong bias toward a news or commercial classification, and a bias against, certain other classifications, such as a soap opera or situation comedy classification.

A variety of conventional techniques, as well as novel techniques, presented below, can be utilized to effect the classification process. Expert systems, knowledge based systems, and the like are particularly well suited to provide a multivariate analysis for classifying video segments based on the parameters associated with face trajectories. At a more analytical level, statistical techniques, such as multivariate correlation analysis, and graphic techniques, such as pattern matching, can be used to effect this classification. For example, a plot of the location of faces in a sequence of image frames over time demonstrates distinguishable patterns common to particular classifications. As noted above, a long sequence of gradual left and right movements of a face at a distance has a high correlation with a weather report, while a short sequence of somewhat random movements has a high correlation with a commercial segment. The graphic representation of each of these sequences provides easily distinguishable patterns. The embodiment of these and other conventional analysis and classification techniques to the classifier 200 will be evident to one of ordinary skill in the art in view of this disclosure.

Also illustrated in FIG. 1 is a text tracking system 400. As in the face tracking system 300, the text tracking system 400 determines the presence of text material in a segment of the video stream 10, and provides a text trajectory corresponding to the path of each text element through a sequence of frames. As distinguished from the face tracking system 300, the text tracking system 400 is less sensitive to the segmentation cues provided by the segmenter 110, because text material often extends across various cuts and shots. For example, the credits at the end of a program, and character introductions at the start of a program, are commonly presented in a foreground while a series of short clips are presented in the background. The scrolling of text provides a strong suggestion of a "credits" classification, which strongly overcomes other classifications of the segments that occur while the text is being scrolled. As in the face tracking system 300, the text tracking system 400 provides text trajectories 401 corresponding to each text element that is detected and tracked through segments of the video stream 10.

The classifier 200 uses either the face trajectories 301 or the text trajectories 401 or, preferably, a combination of both (and other trajectories 501), to provide the classification of segments of the video stream 10. Note that, as might occur with scrolling text, the segments containing different text elements may overlap, and may or may not correspond to the segments associated with face elements. The classifier 200 applied a variety of techniques to effect the above referenced reformulation and classification of segments. Heuristic techniques, including expert systems, knowledge based systems, and the like, are particularly well suited for such segmentation reformulation techniques.

As discussed above, the classification of a segment, and the definition/bounds of the segment, is preferably based on individual object trajectories, as well as the relationships among trajectories within a segment, or the relationships among segments. In one preferred embodiment of this invention, the classifier 200 utilizes a hierarchical multivariate analysis technique. The classifier processes the object trajectories 301, 401, 501 to form a three level hierarchy comprising a video level, a trajectory level, and a model level. At the video level, parameters such as a count of the number of face, text, and other object type trajectories in each segment, the count of the number of object trajectories of each type (face, text, etc.) per unit time, an, average duration of each object type trajectory, an average length of each segment forming a merged segment, and so on, are also used to facilitate classification. At trajectory and a characterization of each object trajectory (still, linear movement, random movement, zoom-in/out, side-to-side, scrolling, etc.) are used to facilitate classification. At the model level, parameters such as type, color, size, and location associated with the each object element corresponding to each object trajectory are used to facilitate classification. Other hierarchy levels, such as a program level, having parameters such as the number of particular-segment sequences, may also be provided to facilitate classification.

In a preferred embodiment, a multi-dimensioned feature space is defined, wherein the features are selected to provide separability among the defined classifications. It has been found that the number of object trajectories for each object type per unit time and their average duration are fairly effective separating features because they represent the "density" of particular objects, such as faces or text, in the segment of the video stream. Additionally, it has been found that trajectories of long duration usually convey more important content information in video, and a preferred embodiment utilizes the number of each object type trajectories with a duration that exceeds a threshold, and their respective average duration as an effective separating feature. Additionally, particular features of particular object types can be used to further facilitate the classification process. For example, the number of face trajectories with shots providing closer than shoulder images is utilized in a preferred embodiment, because it has been found that close-up shots are particularly effective for classification.

A conventional "nearest neighbor" parametric classification approach has been found to be-effective and efficient for program classification. Based on experience, heuristics, and other factors, the center of the parameter space corresponding to each feature is determined. A given segment is characterized using these defined features, the vector distance to each of the classification centers is determined, and the segment is classified as the classification having the closest center. Heuristics are also applied in a preferred embodiment to verify that the classification determined by this parametric approach is reasonable, based for example, on the surrounding context or other factors.

In an alternative embodiment, Hidden Markov Models (HMMs) are used to facilitate the classification process. The Hidden Markov Model approach is particularly well suited for classification based on trajectories, because trajectories represent temporal events, and the Hidden Markov Model inherently incorporates a time-varying model. In a preferred embodiment of this invention, a set of "symbols" is defined corresponding to a set of characterizations, or labels, for characterizing each frame in a segment. In a preferred embodiment that utilizes face and text objects, the symbols include:

1. Anchor person with text;
2. One or more people, long shot, with text;
3. Wide close-up (shoulders and above) without text;
4. Close-up (chest and above) without text;
5. Three or more people without text;
6. Two people, long shot, without text;
7. One or more people, medium close (above waist);
8. No face, more than four lines of text;
9. No face, two to four lines of text;
10. No face, one line of text;
11. Black or white screen, little variation;
12. Initial frame of shot;
13. One person, long shot, without text;
14. No face, no text;
15. Other.

Figure 2:
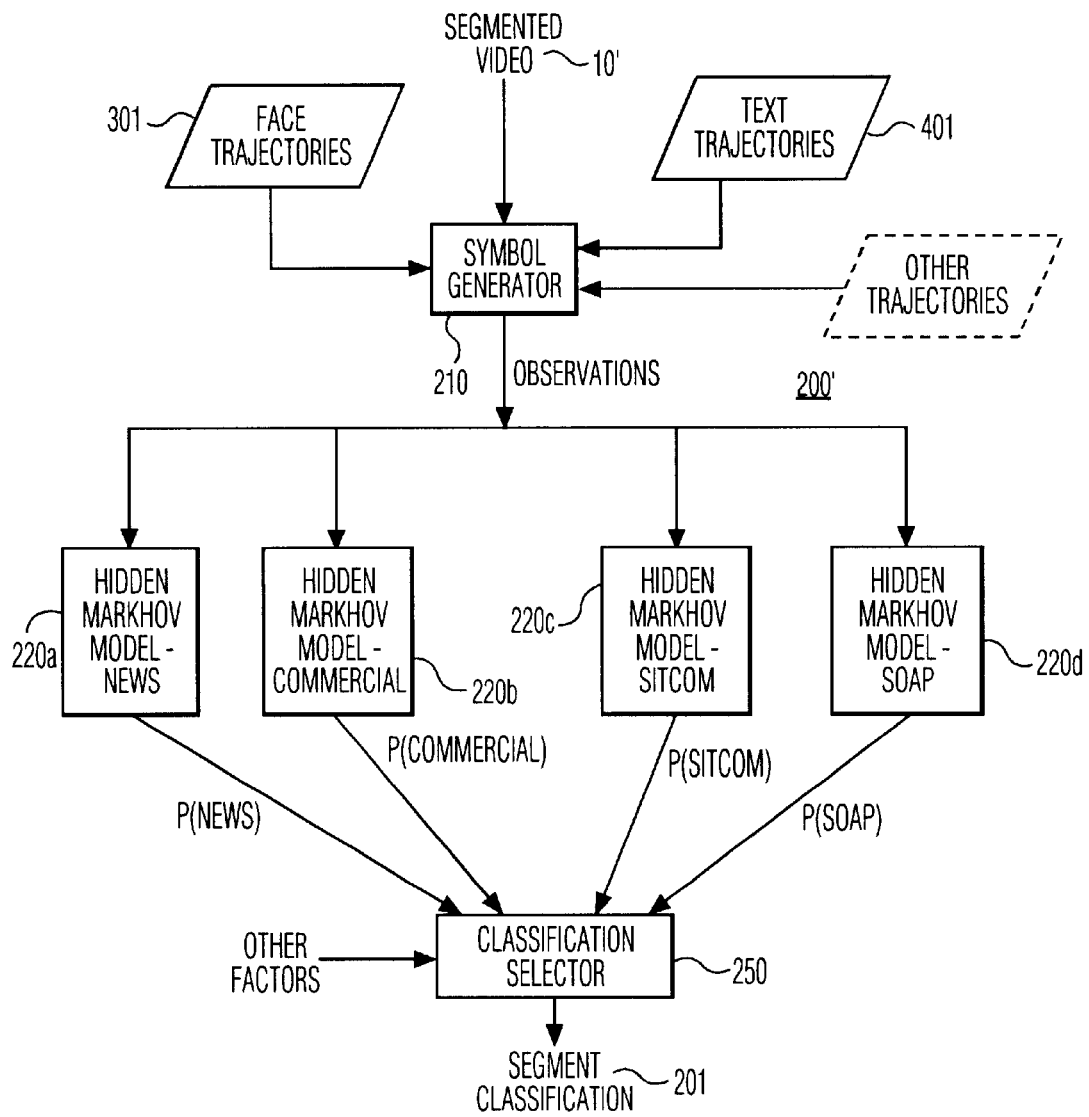
FIG. 2 illustrates a block diagram of an example classifier for classifying a sequence of image frames based on Hidden Markov Models.

FIG. 2 illustrates a block diagram of an example classifier 200' for classifying a sequence of image frames based on HMMs. In the example classifier 200', four classification types are defined: news, commercial, sitcom, and soap. An HMM 220a–d is provided for each classification. Using techniques common in the art, each HMM 220a–d is trained by providing sample sequences of image frames having a known classification. Internal to each HMM 220a–d is a state machine model having a transition probability distribution matrix and a symbol observation probability distribution matrix that models the transition between states and the generation of symbols. The training process adjusts the parameters of the transition probability distribution matrix and a symbol observation probability distribution matrix, and the initial state of the state machine, to maximize the probability of producing the observed sequences corresponding to the sample sequences of the known classification.

After each HMM 220a–d is suitably trained, a new segment 10' is classified by providing a sequence of observation symbols corresponding to the new segment 10' each HMM 220a–d. The symbol generator 210 generates the appropriate symbol for each frame of the sequence of frames forming the segment 10' using, for example, the above list of symbols. If an image can be characterized by more than one symbol, the list of symbols is treated as an ordered list, and the first symbol is selected as the characterizing observation symbol. For example, if the image contains one person in a medium close shot with no text (symbol 7, above), and another person in a close-up shot with no text (symbol 4, above), the image is characterized as a close-up shot with no text (symbol 4). In response to the sequence of observation symbols, each HMM 220a–d provides a probability measure that relates to the likelihood that this sequence of observed symbols would have been produced by a video segment having the designated classification. A classification selector 250 determines the segment classification 201 based on the reported probabilities from each HMM 220a–d. Generally, the classification corresponding to the, HMM having the highest probability is assigned to the segment, although other factors may also be utilized, particular when the difference among the highest reported probabilities from the HMMs 220a–d are not significantly different, or when the highest reported probability does not exceed a minimum threshold level.

As will be evident to one of ordinary skill in the art in view of this disclosure, additional and/or alternative observation symbol sets, and additional and/or alternative classification types may be utilized within the example construct of FIG. 2. If the object types include human figures, for example, a symbol representing multiple human figure objects colliding with each other would serve as an effective symbol for distinguishing-segments of certain sports from other sports or from other classification types. In like manner, other techniques for classifying segments, and sets of segments, based on object trajectories may be utilized in conjunction with, or as an alternative to, the hierarchical parametric-technique and/or the HMM technique presented herein for the classification of segments of video based on object trajectories.

Existing and proposed video encoding standards, such as MPEG-4 and MPEG-7, allow for the explicit identification of objects within each frame or sequence of frames and their corresponding movement vectors from frame to frame. The following describes techniques that can be utilized in addition to, or in conjunction with, such explicit object tracking techniques for tracking the paradigm face and text object types. The application of these techniques, and others, to identify and track other,object types will be evident to one of ordinary skill in the art in view of this disclosure.

Figure 3:
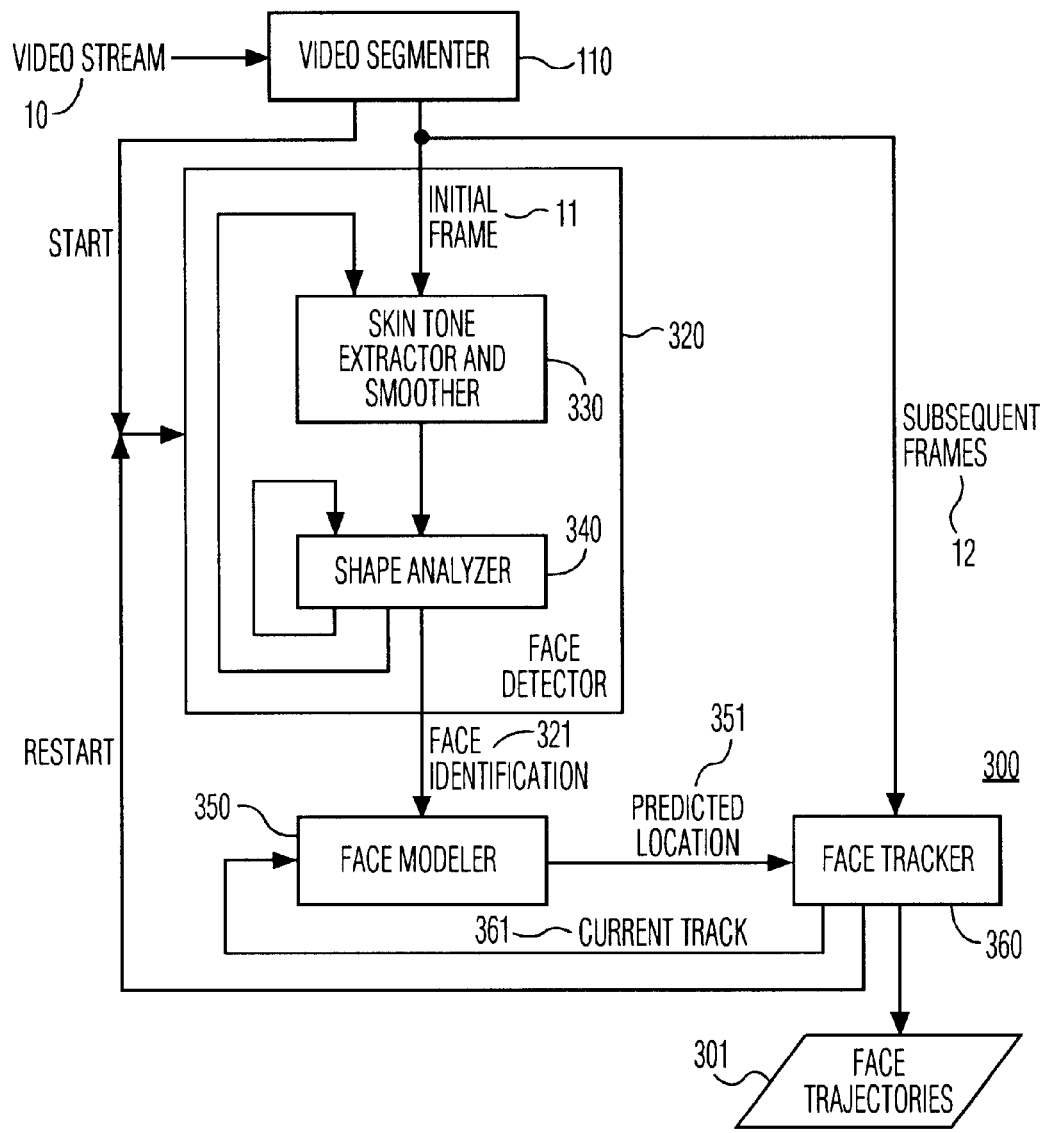
FIG. 3 illustrates a block diagram of an example face tracking system for determining face trajectories in a sequence of image frames.

FIG. 3 illustrates an example block diagram of an example face tracking system 300 for determining face trajectories in a sequence of image frames. The example face tracking system 300 of FIG. 3 includes a face detector 320, a face modeler 350, and a face tracker 360. In a preferred embodiment of this invention, the face tracking system 300 uses the segmentation of, the video stream 10 provided by the segmenter 110 to facilitate face tracking, because most facial images begin and end at the physical cut boundaries typically identified by the segmenter 110. In this example embodiment, the segmenter 110 provides a start signal to the face detector 340. In response to this start signal, the face detector scans an initial frame 11 of the segment to identify one or more faces in the initial frame 11. In the example embodiment of FIG. 3, the face detector 320 comprises a skin tone extractor and smoother 330, and a shape analyzer 340. The skin tone extractor and smoother 330 identifies portions of the initial image frame 11 containing flesh colors, and smoothes the individual pixel elements to provide skin regions to the shape analyzer 340. The shape analyzer 340 processes the identified skin regions to determine whether each region, or a combination of adjacent regions, form a face image.

As indicated in FIG. 3, the face detection process includes iterations through the extraction 330 and analyzing 340 processes, and is typically a time consuming process. To minimize the time required to find and identify a face in each subsequent image frame, the face modeler 350 and face tracker 360 are configured to use predictive techniques for determining each face trajectory. After the face detector 320 locates and identifies a face within the initial image frame 11, the face modeler 350 predicts the location of the face in the next subsequent image frame 12. Initially, lacking other information, the location of the face in the next subsequent frame 12 is predicted to be the same as the location of the face in the initial frame 11. Rather than searching the entire next image frame for the identified face 321, the face tracker 360 searches only within the vicinity of the predicted location 351 for this identified face 321. In a preferred embodiment of this invention, the face tracker 360 utilizes a significantly simpler, and therefore faster, technique for determining the presence of a face, compared to the process used in the face detector 320. Within the vicinity of the predicted face location, the individual picture elements (pixels) are classified as "face" or "non-face", based on their deviation from the characteristics of the identified face 321. If a sufficient distribution of "face" pixels is detected in the vicinity of the predicted location, the distribution of face pixels is declared to be the identified face 321, and the location of this distribution of face pixels in the subsequent frame 12 is determined. Note that, because the video segmenter 110 provides segmentation information, such as the location of cuts, the likelihood of mistaking a different face in a subsequent frame 12 from the identified face 321 within the vicinity of the predicted location 351 is minimal.

When the identified face 321 is located in the next subsequent frame 12, the face tracker 360 provides feedback 361 to the face modeler 350 to improve the modeler's predictive accuracy. This feedback 361 may be the determined location of the identified face 321 in the frame 12, a differential parameter related to the prior location, and so on In a preferred embodiment of this invention, the face modeler applies appropriate data smoothing techniques, such as a Kalman filter, to minimize the effects of slight or interim movements. The face modeler 350 provides the next predicted location 351, based on the feedback 361 from the face tracker 360, to the face tracker 360 to facilitate the identification and location of the face identification 321 in the next subsequent frame 12, and the process continues.

The face tracker 360 of FIG. 3 is also configured to restart the face detection process in the face detector 320. This restart may be effected whenever the face tracker 360 fails to locate a face within the vicinity of the predicted location 351, or in dependence upon other factors that are correlated to the appearance of new faces in an image. For example, MPEG and other digital encodings of video information use a differential encoding, wherein a subsequent frame is encoded based on the difference from a prior frame. If a subsequent frame 12 comprises a large encoding, indicating significant changes, the face tracker 360 may initiate a restart of the face tracker to locate all faces in this subsequent frame 12. In response to this restart signal, the face detector updates the set of face identifications associated with the current segment to remove identified faces that were not found in the subsequent frame 12, or to add identified faces that had not been previously located and identified in prior frames.

By minimizing the region in which to search for each identified face 321 in each subsequent frame 12, and by minimizing the complexity of the identification task for each subsequent frame 12, the face tracker 360 can provide a continuous and efficient determination of the location of each identified face in each subsequent frame 12. Other optimization techniques may also be applied. For example, the search region about the predicted location 351 can be dynamically adjusted, based on a confidence factor associated with the predicted location 351. If, for example, the identified face is determined to be stationary for 100 frames, the "prediction" that the face will be located at the same location in the $101^{st}$ frame has a higher confidence factor than the initial default prediction that the face will be located at the initial location in the $2^{nd}$ frame, and thus the search region of the $101^{st}$ frame can be smaller than the initial search region of the $2^{nd}$ frame. In like manner, if the face is moving quickly and somewhat randomly in the sequence of 100 frames, the predicted location for the location of the face in the $101^{st}$ frame is less reliable, and a wider search region about the predicted location in the $101^{st}$ frame would be warranted. In like manner, the aforementioned MPEG differential coding can be used to eliminate the need to search select subsequent frames 12 when these frames indicate little or no change compared to their prior frames.

The form and content of the produced face trajectories 301 from the face tracker 360 will be dependent upon the techniques used by the classifier 200 in FIG. 1, and the parameters required by these techniques. For example, using an HMM classifier 200' as presented in FIG. 2, the face trajectories 301 will preferably contain information related to each frame of the segment, but the information can merely be the location of the face relative to a distance from a camera, and may be characterized as "close-up", "medium-close", "long", and so on. Using a parametric classifier 200, the face trajectories 301 may contain a synopsis of the movement of the face, such as "fixed", "moving laterally", "approaching", "leaving", and so on, or it may contain the determined location of the face in each frame of the segment. The appropriate information to be contained in the face trajectories 301 will be evident to one of ordinary skill in the art in light of the selected method employed to effect the segment classification.

Figure 4:
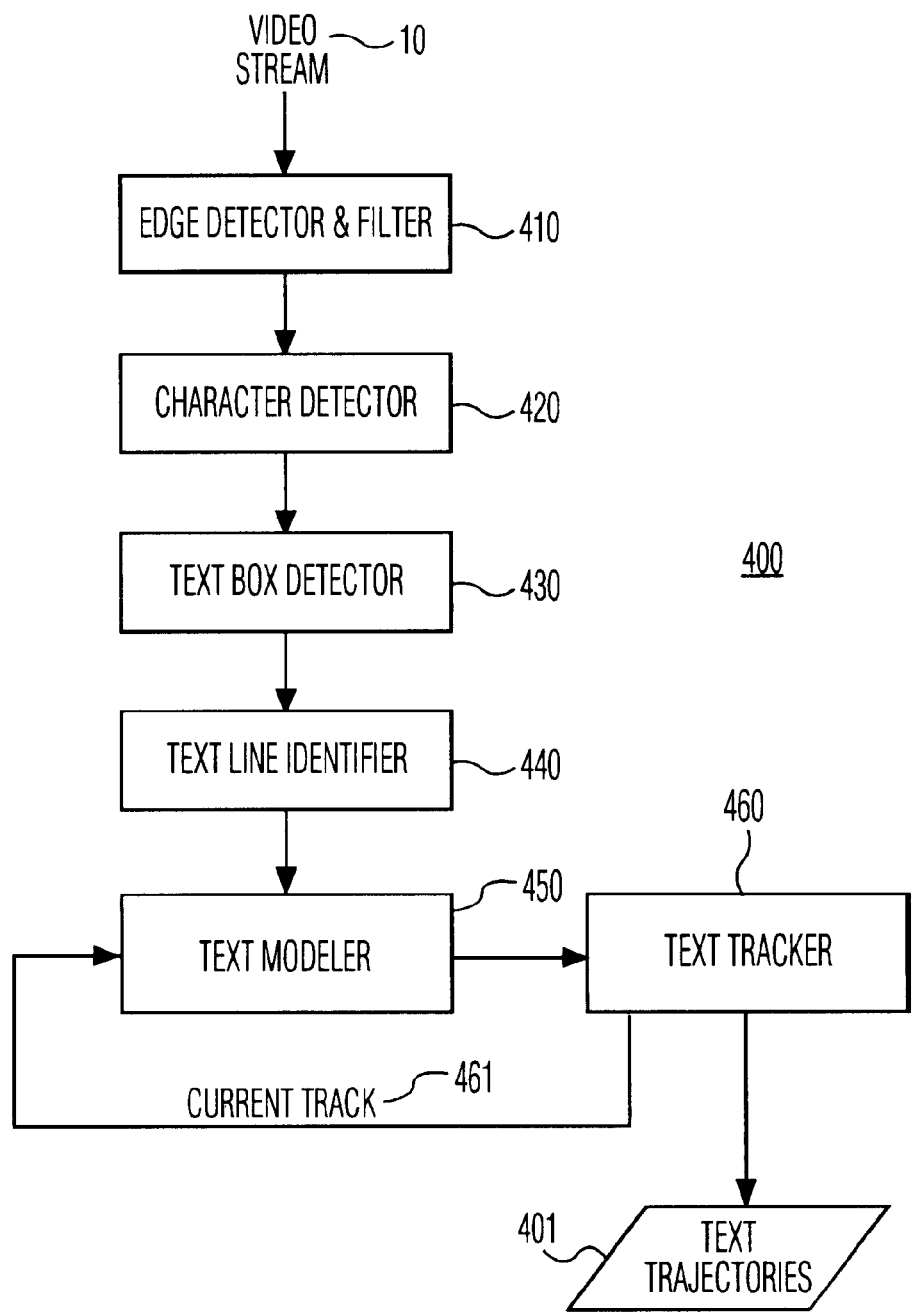
FIG. 4 illustrates a block diagram of an example text tracking system for determining text trajectories in a sequence of image frames.

FIG. 4 illustrates an example block diagram of a text tracking system 400 for determining text trajectories 401 within a sequence of images. The edge detector and filter 410 identifies the presence of edges that are characteristic of text elements. The character detector 420 identifies the presence of character-like elements formed by the identified edges. The text box detector 430 identifies regions of the image containing somewhat contiguous characters, and the text line detector 440 identifies combinations of text boxes forming one or more lines of contiguous text. These identified lines of text are formulated into text models by the text modeler 450. The text models include, for example, the color and size of each text line, and may also include an identification of the actual characters forming each text line. In this example system 400, the above processes are repeated for each frame of the sequence of image frames, because these edge and character based processes typically require very little time to complete. The text modeler 450 reports the location of each text line, if any, in each frame to the text tracker 460. The text tracker 460 formulates the text trajectory information 401 in dependence upon the techniques and parameters employed by the classifier 200 of FIG. 1, as discussed above. Illustrated in FIG. 4, the text tracker 460 optionally provides feedback 461 to the text modeler 450 to facilitate a determination of whether each identified text line from the text line identifier 440 is new or previously identified. This feedback 461 is particularly useful for maintaining a correspondence of text elements that are rapidly scrolled. Note that the performance of the text tracking system 400 may be improved by employing some or all of the optimization techniques presented with respect to the face tracking system 300. For example, the elements 410-440 can be configured to identify text in initial frames, and the text tracker 460 can be configured to process subsequent frames based on the identified text elements of prior frames, using for example conventional pattern or character matching techniques. Other optimization techniques, such as the use of MPEG-provided measures of differences between frames and the like, may also be employed. The determination of whether to employ such optimization techniques will depend upon the overhead burden associated with the technique as compared to the expected gain in performance provided by the technique.

The foregoing merely illustrates the principles of the invention. It will thus be appreciated that those skilled in the art will be able to devise-various arrangements which, although not explicitly described or shown herein, embody the principles of the invention and are thus within its spirit and scope. For example, the principles presented herein can be combined with other image characterization and classification techniques and systems, and other parameters may also be used in the classification process. The number of optical cuts, such as fade, dissolve, and wipe, or the percentage of such cuts within a segment has been found to be very effective for distinguishing news and commercials from other classifications. In like manner, the applications of the disclosed techniques are not necessarily limited to the examples provided. For example, as discussed above, a program classification, such as a news program, may be characterized by a sequence of sub-segments of particular classification types. The classification of each sub-segment can form observation symbols, and Hidden Markov Models can be defined that model sequences of observed sub-segment classifications corresponding to each program classification type. These and other system configuration and optimization features will be evident to one of ordinary skill in the art in view of this disclosure, and are included within the scope of the following claims.

We claim:

1. A method of classifying content material of a sequence of image frames, comprising:
   identifying at least one object image in an initial image frame of the sequence of image frames, the at least one object image including one or more regions of facial color in the initial image frame and the one or more regions of facial color are processed to identify a select region as the at least one object image,
   determining at least one object trajectory associated with the at least one object image based on subsequent frames of the sequence of image frames, and
   maintaining a video level parameter associated with the sequence of image frames, the video level parameter including:
      an object trajectory count of the one or more object trajectories,
      an average duration of the one or more object trajectories, and
      a frame count of the sequence of image frames; and
   classifying the content material of the sequence of image frames based on the video level parameters.

2. The method of claim 1, wherein the at least one object image corresponds to at least one of: a face image, a figure image, and a text image.

3. The method of claim 1, wherein determining the at least one object trajectory includes
   identifying an initial location of the at least one object image,
   identifying a target region of each subsequent frame of the subsequent frames,
   identifying the at least one object image in the target region and a corresponding subsequent location of each subsequent frame containing the at least one object image,
   determining the at least one object trajectory based on the initial location and the subsequent location of the at least one object image in each subsequent frame.

4. The method of claim 3, wherein identifying the target region of each subsequent frame is based on the at least one object trajectory.

5. The method of claim 1, wherein classifying the sequence includes:
   identifying a set of classes within which the sequence of image frames is classified,
   determining a class location within a vector space corresponding to each class of the set of classes, each class location corresponding to features of the corresponding class,
   classifying the sequence based on a vector distance between features of the at least one object trajectory and each class location corresponding to each class.

6. The method of claim 1, wherein classifying the sequence includes:
   generating a sequence of symbols corresponding to the at least one object trajectory,
   providing the sequence of symbols to a plurality of markov models, each model of the plurality of markov models providing a statistic based on the plurality of markov models, and
   classifying the sequence of image frames based on the statistics provided by the plurality of markov models.

7. The method of claim 1, wherein identifying the at least one object image corresponding to a text image includes:
   identifying distinct edges in an image frame of the sequence of image frames,
   identifying portions of the image frame that contain character elements, based on the distinct edges,
   identifying the text box based on the portions of the image frame that contain character elements.

8. A method of classifying a sequence of image frames, the sequence of image frames comprising one or more object trajectories, the method comprising:
   maintaining a set of parameters associated with the sequence of image frames, the set of parameters including at least one of: a video level parameter, a trajectory level parameter, and a model level parameter,
   the video level parameter including at least one of:
      an object trajectory count of the one or more object trajectories,
      an average duration of the one or more object trajectories, and
      a frame count of the sequence of image frames;
   the trajectory level parameter including at least one of:
      an object trajectory duration associated with each object trajectory of the one or more object trajectories, and
      a characterization of the each object trajectory of the one or more object trajectories; and
   the model level parameter including at least one of:
      an object type associated with each object trajectory,
      an object color associated with each object trajectory of the one or more object trajectories,
      an object location associated with each object trajectory of the one or more object trajectories, and
      an object size associated with each object trajectory of the one or more object trajectories; and
   classifying the sequence of image frames based on the set of parameters.

9. The method of claim 8, wherein the one or more object trajectories corresponds to at least one of: a face trajectory, a figure trajectory, and a text trajectory.

10. The method of claim 8, wherein the set of parameters further includes a measure associated with a count of optical cuts within the sequence of image frames.

11. An image processor for classifying content material of a sequence of image frames, comprising:
   an object identifier that is configured to identify at least one object image in an initial image frame of the sequence of image frames, the object identifier including a skin tone identifier that is configured to identify one or more regions of facial color in the initial image frame, and a shape analyzer that is configured to process the one or more regions of facial color to identify a select region as the at least one object image,
   an object tracker that is configured to provide at least one object trajectory associated with the at least one object image based on subsequent frames of the sequence of image frames, wherein said object tracker maintains a set of parameters associated with the sequence of image frames,
   the set of parameters including at least one of: a video level parameter, a trajectory level parameter, and a model level parameter,
   the video level parameter including at least one of:
      an object trajectory count of the one or more object trajectories,
      an average duration of the one or more object trajectories, and
      a frame count of the sequence of image frames;

the trajectory level parameter including at least one of:
an object trajectory duration associated with each object trajectory of the one or more object trajectories, and
a characterization of the each object trajectory of the one or more object trajectories; and the model level parameter including at least one of:
an object type associated with each object trajectory,
an object color associated with each object trajectory of the one or more object trajectories,
an object location associated with each object trajectory of the one or more object trajectories, and
an object size associated with each object trajectory of the one or more object trajectories: and a classifier that is configured to classify the content material of the sequence of image frames based on the set of parameters.

12. The image processor of claim 11, wherein
the at least one at least one object image corresponds to at least one of: a face image, a figure image, and a text image.

13. The image processor of claim 11, wherein
the object tracker determines the at least one object trajectory in an iterative manner, based on an initial location of the at least one object image in the initial image frame and one or more subsequent locations of the at least one object image in one or more subsequent frames of the sequence of image frames, and
the image processor further includes
an object modeler, operably coupled to the object tracker, that is configured to
identify the initial location of the at least one object image, and
identify a target region of each next frame of the one or more subsequent frames, based on the initial location and the at least one object trajectory, to facilitate a determination of a next location of the one or more subsequent locations within the target region.

14. The image processor of claim 11, wherein
the classifier is further configured to
maintain a hierarchy of object trajectory information based on the at least one object trajectory, and
classifies the sequence based on parameters at each hierarchy of object trajectory information.

15. The image processor of claim 11, wherein
the classifier further includes:
a symbol generator that is configured to generate a sequence of symbols corresponding to the at least one object trajectory, and
a plurality of markov models, each model of the plurality of markov models being configured to determine a statistic based on the sequence of symbols corresponding to the at least one object trajectory, and
wherein
the classifier classifies the sequence of image frames based on the statistics provided by the plurality of markov models.

16. The image processor of claim 11, wherein
the object identifier includes
an edge detector that is configured to identify distinct edges in an image frame of the sequence of image frames,
a character detector that is configured to process the distinct edges and to identify therefrom portions of the image frame that contain character elements, and
a text box detector that is configured to identify a text box based on the portions of the image frame that contain character elements, the text box corresponding to the at least one object image, and
wherein the object tracker is configured to determine the at least one object trajectory based on one or more locations of the text box in one or more subsequent frames of the sequence of image images.

17. The image processor of claim 16, wherein the object identifier further includes
a text line identifier that is configured to locate contiguous text boxes and provide therefrom a text line identifier to the object tracker to further facilitate the determination of the at least one object trajectory.

18. The image processor of claim 11, wherein
the classifier classifies the sequence of image frames based on a vector distance between features of the at least one object trajectory and a class location corresponding to features of each identified class within which the sequence of image frames is classified.

* * * * *